US012584818B2

(12) United States Patent
Ono

(10) Patent No.: US 12,584,818 B2
(45) Date of Patent: Mar. 24, 2026

(54) LIGHT INTENSITY DISTRIBUTION PATTERN MEASURING DEVICE AND METHOD

(71) Applicant: NTT, Inc., Tokyo (JP)

(72) Inventor: Shingo Ono, Musashino (JP)

(73) Assignee: NTT, Inc., Tokyo (JP)

( * ) Notice: Subject to any disclaimer, the term of this patent is extended or adjusted under 35 U.S.C. 154(b) by 106 days.

(21) Appl. No.: 18/685,766

(22) PCT Filed: Sep. 17, 2021

(86) PCT No.: PCT/JP2021/034274
§ 371 (c)(1),
(2) Date: Feb. 22, 2024

(87) PCT Pub. No.: WO2023/042370
PCT Pub. Date: Mar. 23, 2023

(65) Prior Publication Data
US 2024/0353289 A1      Oct. 24, 2024

(51) Int. Cl.
G01M 11/00 (2006.01)
G01M 11/02 (2006.01)

(52) U.S. Cl.
CPC ...... G01M 11/331 (2013.01); G01M 11/0207 (2013.01); G01M 11/0264 (2013.01); G01M 11/333 (2013.01); G01M 11/335 (2013.01)

(58) Field of Classification Search
CPC ......... G01M 11/0207; G01M 11/0264; G01M 11/331; G01M 11/333; G01M 11/335
See application file for complete search history.

(56) References Cited

U.S. PATENT DOCUMENTS

| | | | | |
|---|---|---|---|---|
| 2006/0274318 A1* | 12/2006 | Jensen | ................. | G01M 11/332 |
| | | | | 356/477 |
| 2009/0262337 A1* | 10/2009 | Nicholson | ............ | G01M 11/331 |
| | | | | 356/73.1 |
| 2013/0229662 A1* | 9/2013 | Ogawa | ................. | G01M 11/335 |
| | | | | 356/453 |

FOREIGN PATENT DOCUMENTS

| | | | |
|---|---|---|---|
| JP | 2017040568 A | * | 2/2017 |
| JP | 2017110953 A | * | 6/2017 |

OTHER PUBLICATIONS

M. Laurila, R. Barankov, M. M. Jorgensen, T. T. Alkeskjold, J. Broeng, J. Laegsbaard, and S. Ramachandran, "Cross-correlated imaging of single-mode photonic crystal rod fiber with distributed mode filtering," Opt. Express, vol. 21, No. 8, pp. 9215-9229, 2013.

* cited by examiner

*Primary Examiner* — Michael A Lyons
(74) *Attorney, Agent, or Firm* — Harness, Dickey & Pierce, P.L.C.

(57) ABSTRACT

A light intensity distribution pattern measurement device according to the present disclosure includes: a two-dimensional imaging sensor for receiving multiplexed light that is obtained by multiplexing transmitted light obtained by injecting one branched light of first continuous light into an optical fiber under measurement, reference light that is the other branched light of the first continuous light, and local light; and a signal processing unit for performing digital signal processing on a light reception signal I (t) of each pixel obtained by the two-dimensional imaging sensor, in which the signal processing unit measures a light intensity distribution pattern, by calculating a square of an autocorrelation function between the light reception signal I (t) and a light reception signal I (t+τ) obtained by shifting the light (Continued)

[3]

reception signal by time $\tau$, for each pixel of the two-dimensional imaging sensor.

8 Claims, 4 Drawing Sheets

AUTOCORRELATION FUNCTION $$R(\tau, x, y) = \int I(t, x, y)I(t + \tau, x, y)dt$$

$I(t, x, y)$  $I(t+\tau, x, y)$ $\tau$

LIGHT RECEPTION INTENSITY

TIME

[2A]

[2B]

[3]

LIGHT INTENSITY DISTRIBUTION PATTERN MEASURING DEVICE AND METHOD

CROSS-REFERENCE TO RELATED APPLICATIONS

This application is a 371 U.S. National Phase of International Application No. PCT/JP2021/034274, filed on Sep. 17, 2021. The entire disclosure of the above application is incorporated herein by reference.

TECHNICAL FIELD

The present disclosure relates to a characteristics evaluation technical field for optical fibers and optical devices.

BACKGROUND ART

One of the technologies for increasing the capacity of optical fiber communication is a mode division multiplexing transmission technology for multiplexing signals in a plurality of propagation modes using a multi-mode optical fiber. In order to ensure desired transmission performance in mode division multiplexing transmission, it is important to check that a plurality of propagation modes are appropriately excited and propagated with respect to a used multi-mode optical fiber. In the multi-mode optical fiber, since each propagation mode has a light intensity distribution (hereinafter, a light intensity distribution pattern) unique to an optical fiber cross-sectional direction, the propagation mode of the multi-mode optical fiber can be identified by measuring the light intensity distribution pattern of the transmitted light. By measuring the light intensity distribution pattern, the excitation/propagation state of each propagation mode can be grasped, and the connection loss of each propagation mode can be estimated.

One of methods for measuring a light intensity distribution pattern is a low coherence light interference method. The outline of the light intensity distribution pattern measurement using the low coherence light interference method is as described in Non Patent Literature 1. Specifically, continuous light from a low coherence light source is branched, one branched light is injected into the optical fiber under measurement, the other branched light is provided with certain delay as reference light, then the light is multiplexed with transmitted light from the optical fiber under measurement, and the multiplexed light is received by a two-dimensional imaging sensor such as a charge coupled device (CCD) camera. At this time, a strong interference signal is obtained when the delay time given to the reference light matches the propagation delay time of the optical fiber under measurement. In general, since the propagation delay time in the multi-mode optical fiber differs for each propagation mode, the light intensity distribution pattern of a certain propagation mode can be observed by adjusting the optical path length of the reference light so that the delay time of the reference light matches the propagation delay time of the certain propagation mode.

CITATION LIST

Non Patent Literature

Non Patent Literature 1: M. Laurila, R. Barankov, M. M. Jorgensen, T. T. Alkeskjold, J. Broeng, J. Laegsbaard, and S. Ramachandran, "Cross-correlated imaging of single-mode photonic crystal rod fiber with distributed mode filtering," Opt. Express, Vol. 21, No. 8, pp. 9215-9229, 2013.

SUMMARY OF INVENTION

Technical Problem

In the light intensity distribution pattern measurement using the conventional low coherence optical interference method, it is necessary to adjust the optical path length of the reference light in order to match the delay time given to the reference light with the propagation delay time of each propagation mode of the optical fiber under measurement, and accurate design of the optical system and stability of the installation environment are required, and it may be difficult to perform the measurement. In order to measure the light intensity distribution pattern, the delay time difference between the propagation modes needs to be within the maximum delay amount determined by the movable range of the optical path length of the reference light. Therefore, the measurable optical fiber is limited to a relatively short optical fiber, and there is a problem that it is difficult to measure a km-order long optical fiber analogous to an actual transmission path.

The present disclosure has been made in view of the above circumstances, and an object of the present disclosure is to provide light intensity distribution pattern measurement device and method capable of measuring a light intensity distribution pattern of a desired propagation mode, without adjusting a propagation delay time of reference light, even in a long optical fiber in light intensity distribution pattern measurement using a low coherence light interference method.

Solution to Problem

In order to achieve the above object, the present disclosure achieves light intensity distribution pattern measurement, without physical optical path length adjustment, by multiplexing continuous light after transmission through an optical fiber under measurement and local light having high coherence to perform coherent detection and performing digital autocorrelation processing on a signal obtained by the coherent detection.

Specifically, a light intensity distribution pattern measurement device according to the present disclosure includes:

a first light source for outputting first continuous light;

a second light source for outputting second continuous light as local light;

a two-dimensional imaging sensor for receiving multiplexed light obtained by multiplexing transmitted light that is obtained by injecting one branched light of the first continuous light into an optical fiber under measurement, reference light that is the other branched light of the first continuous light, and the local light; and a signal processing unit for performing digital signal processing on a light reception signal $I(t)$ of each pixel obtained by the two-dimensional imaging sensor, in which the signal processing unit measures a light intensity distribution pattern, by calculating a square of an autocorrelation function between the light reception signal $I(t)$ and a light reception signal $I(t+\tau)$ obtained by shifting the light reception signal by time $\tau$, for each pixel of the two-dimensional imaging sensor.

Specifically, a light intensity distribution pattern measurement method according to the present disclosure includes:

receiving, by a two-dimensional imaging sensor, multiplexed light obtained by multiplexing transmitted light that is obtained by injecting one branched light of first continuous light into an optical fiber under measurement, reference light that is the other branched light of the first continuous light, and local light that is second continuous light; and measuring a light intensity distribution pattern, by calculating a square of an autocorrelation function between a light reception signal I (t) of each pixel obtained by the two-dimensional imaging sensor and a light reception signal I (t+τ) obtained by shifting the light reception signal by time τ, for each pixel of the two-dimensional imaging sensor.

Advantageous Effects of Invention

According to the present disclosure, it is practical to provide light intensity distribution pattern measurement device and method capable of measuring a light intensity distribution pattern of a desired propagation mode, without adjusting a propagation delay time of reference light, even in a long optical fiber in light intensity distribution pattern measurement using a low coherence light interference method.

DESCRIPTION OF EMBODIMENTS

Figure 1:
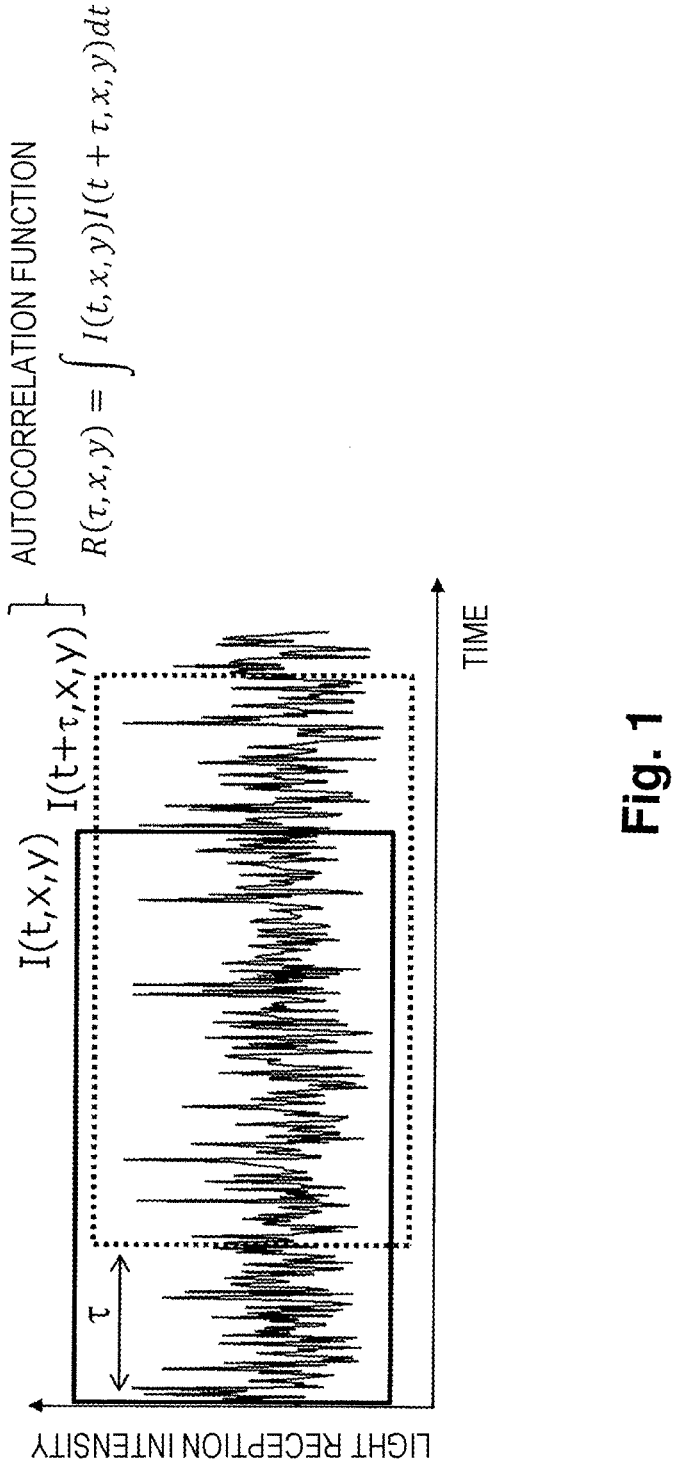
FIG. 1 is a conceptual diagram of a method for calculating an autocorrelation function in the present disclosure.

Hereinafter, embodiments of the present disclosure will be described in detail with reference to the drawings. Note that the present disclosure is not limited to the embodiments described below. These embodiments are merely examples, and the present disclosure can be carried out in forms with various modifications and improvements based on the knowledge of those skilled in the art. Components having the same reference numerals in the present specification and the drawings are the same components.

A light intensity distribution pattern measurement device of the present disclosure includes: a first light source that outputs incident light to an optical fiber under measurement; a second light source that outputs local light for being multiplexed with transmitted light of the optical fiber under measurement; and a two-dimensional imaging sensor that receives multiplexed light of the transmitted light and the local light. The incident light and the local light are both continuous light. In the present disclosure, a light intensity distribution pattern is measured by imaging multiplexed light via a two-dimensional imaging sensor. Then, a signal processing unit that performs digital signal processing on the light reception signal obtained by the two-dimensional imaging sensor obtains, for each pixel of the two-dimensional imaging sensor, an autocorrelation function regarding time of the light reception signal obtained by receiving the multiplexed light of the transmitted light and the local light. As a result, the present disclosure enables measurement of a light intensity distribution pattern of a desired propagation mode, without adjusting the propagation delay time of the reference light, even in a long optical fiber.

Embodiment

In the present disclosure, in the same way as the conventional low coherence light interference method, the continuous light output from the first light source is branched, one branched light is injected into the optical fiber under measurement, and the other branched light is used as the reference light. This will be described below in more detail.

Given that the number of propagation modes in the optical fiber under measurement is N, the complex electric field amplitude of the transmitted light of the i-th (i=1 to N) propagation mode in the (x, y) coordinates of the two-dimensional imaging sensor is $E_i$ (t, x, y), the complex electric field amplitude of the reference light is $E_0(t)$, and the complex electric field amplitude of the local light is $E_{lo}$ (t), the light reception signal I (t, x, y) representing the light intensity of the pixel, arranged in the (x, y) coordinates of the two-dimensional imaging sensor, obtained by coherent detection is expressed as the following expression. Here, it is assumed that the reference light and the local light are each capable of being regarded as a plane wave with respect to the light receiving surface of the two-dimensional imaging sensor.

[Math. 1]

$$I(t, x, y) = \left| E_0(t) + \sum_{i=1}^{N} E_i(t, x, y) + E_{lo}(t) \right|^2 \quad (1)$$

Given that a propagation delay time difference of the i-th propagation mode with respect to the reference light is $\tau_i$, $E_i$ (t, x, y) is expressed as the following expression.

[Math. 2]

$$E_i(t, x, y) = \sqrt{\alpha_i(x, y)} E_0(t - \tau_i) \quad (2)$$

Here, $\alpha_i$ (x, y) is a light intensity pattern of the i-th propagation mode. Given that Expression (2) is substituted into Expression (1), I (t, x, y) is expressed as the following expression.

[Math. 3]

$$I(t, x, y) = \left| E_0(t) + \sum_{i=1}^{N} \sqrt{\alpha_i(x, y)} E_0(t - \tau_i) + E_{lo}(t) \right|^2 \quad (3)$$

Assuming that the local light intensity is sufficiently higher than the incident light intensity from the first light source, and that the interference component between rays of transmitted light, the interference component between rays of reference light, and the interference component between a ray of transmitted light and a ray of reference light are negligible, I (t, x, y) can be expressed as the following expression.

[Math. 4]

$$I(t, x, y) \cong I_0(t) + \sum_{i=1}^{N} \sqrt{\alpha_i(x, y)} I_i(t) \tag{4}$$

[Math. 5]

$$I_0(t) \equiv E_0(t)E_{lo}^*(t) + E_0^*(t)E_{lo}(t) \tag{5}$$

[Math. 6]

$$I_i(t) \equiv E_0(t - \tau_i)E_{lo}^*(t) + E_0^*(t - \tau_i)E_{lo}(t) \tag{6}$$

Next, an autocorrelation function R (τ, x, y) of I (t, x, y) is calculated. FIG. 1 illustrates a calculation image of R (τ, x, y). Regarding R (τ, x, y), a time integral of a product of I (t, x, y) and a waveform I (t+τ, x, y), obtained by shifting I (t, x, y) by a certain time τ, is calculated as a function of τ. R (τ, x, y) is calculated by digital signal processing on the basis of the following expression.

[Math. 7]

$$R(\tau, x, y) = \int I(t, x, y)I(t + \tau, x, y)dt = \int I_0(t)I_0(t + \tau)dt + \tag{7}$$

$$\sum_{i=1}^{N}\sqrt{\alpha_i(x, y)} \int I_0(t)I_i(t + \tau)dt + \sum_{i=1}^{N}\sqrt{\alpha_i(x, y)} \int I_i(t)I_0(t + \tau)dt +$$

$$\sum_{i=1}^{N}\sum_{j=1}^{N}\sqrt{\alpha_i(x, y)} \sqrt{\alpha_j(x, y)} \int I_i(t)I_j(t + \tau)dt$$

When the transmitted light intensity of the optical fiber under measurement is sufficiently lower than that of the reference light ($\alpha_i$ (x, y)<<1), the fourth term of Expression (7) is negligible. The first to third terms are calculated by the expressions below.

[Math. 8]

$$\int I_0(t)I_0(t + \tau)dt = \int E_0(t)E_0^*(t + \tau)E_{lo}^*(t)E_{lo}(t + \tau)dt + c.c. \tag{8}$$

[Math. 9]

$$\int I_0(t)I_i(t + \tau)dt = \int E_0(t)E_0^*(t - \tau_i + \tau)E_{lo}^*(t)E_{lo}(t + \tau)dt + c.c. \tag{9}$$

[Math. 10]

$$\int I_i(t)I_0(t + \tau)dt = \int E_0(t - \tau_i)E_0^*(t + \tau)E_{lo}^*(t)E_{lo}(t + \tau)dt + c.c. \tag{10}$$

Here, c.c. represents the complex conjugate of the entire upper term. When the coherence time of the local light is sufficiently long in comparison with a possible value of τ, $E^*_{lo}$ (t) $E_{lo}$ (t+τ) and its complex conjugate can be regarded as a constant that does not depend on t. When the coherence time of the incident light is sufficiently small in comparison with a possible value of τ, it can be considered that the following expression holds.

[Math. 11]

$$\int E_0(t)E_0^*(t + \tau)dt = \int E_0^*(t)E_0(t + \tau)dt \propto \begin{cases} 1 & (\tau = 0) \\ 0 & (\tau \neq 0) \end{cases} \tag{11}$$

Given that Expressions (8) to (11) are substituted into Expression (7), R (τ, x, y) and its square [R (τ, x, y)]² in the region of τ>0 are as follows.

[Math. 12]

$$R(\tau, x, y) \propto \begin{cases} \sqrt{\alpha_i(x, y)} & (\tau = \tau_i) \\ 0 & (\tau \neq \tau_i) \end{cases} \tag{12}$$

[Math. 13]

$$[R(\tau, x, y)]^2 \propto \begin{cases} \alpha_i(x, y) & (\tau = \tau_i) \\ 0 & (\tau \neq \tau_i) \end{cases} \tag{13}$$

Figure 2A:
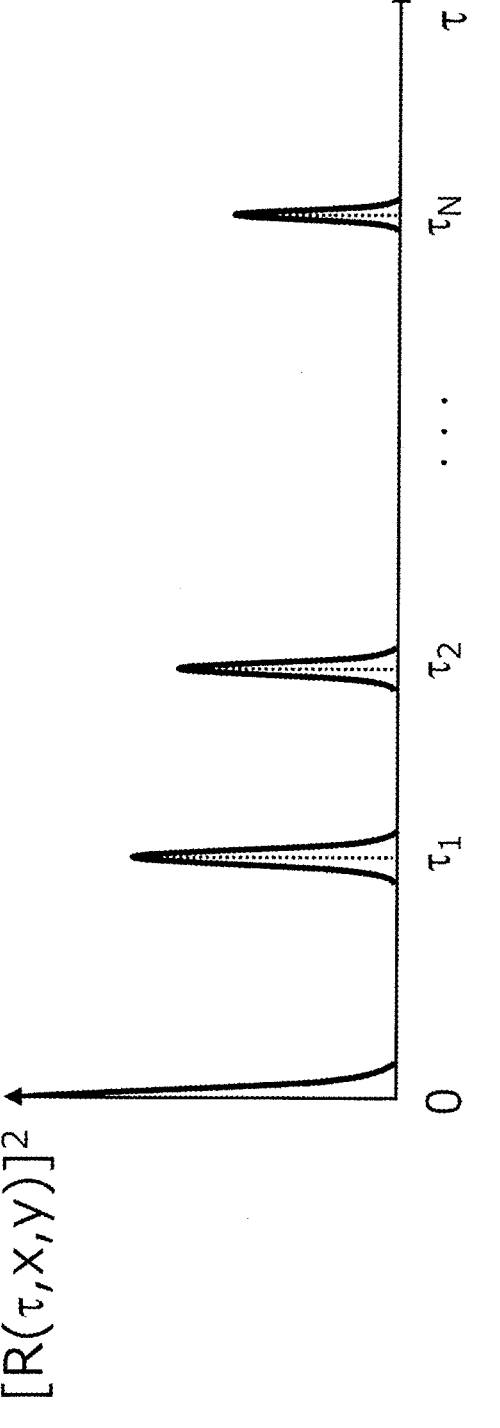
FIG. 2A is a conceptual diagram of a calculation result of a square of an autocorrelation function in the present disclosure.

FIG. 2A illustrates a waveform image regarding the time τ of [R (τ, x, y)]² calculated as described above. FIG. 2A illustrates [R (τ, x, y)]² calculated for various sorts of time t on the basis of light received by pixels arranged in specific (x, y) coordinates. The square [R ($\tau_i$, X, y)]² of the autocorrelation function at τ=$\tau_i$ (i=1 to N) illustrated in FIG. 2A corresponds to the value of the (x, y) coordinates in the light intensity pattern of the i-th propagation mode.

Figure 2B:
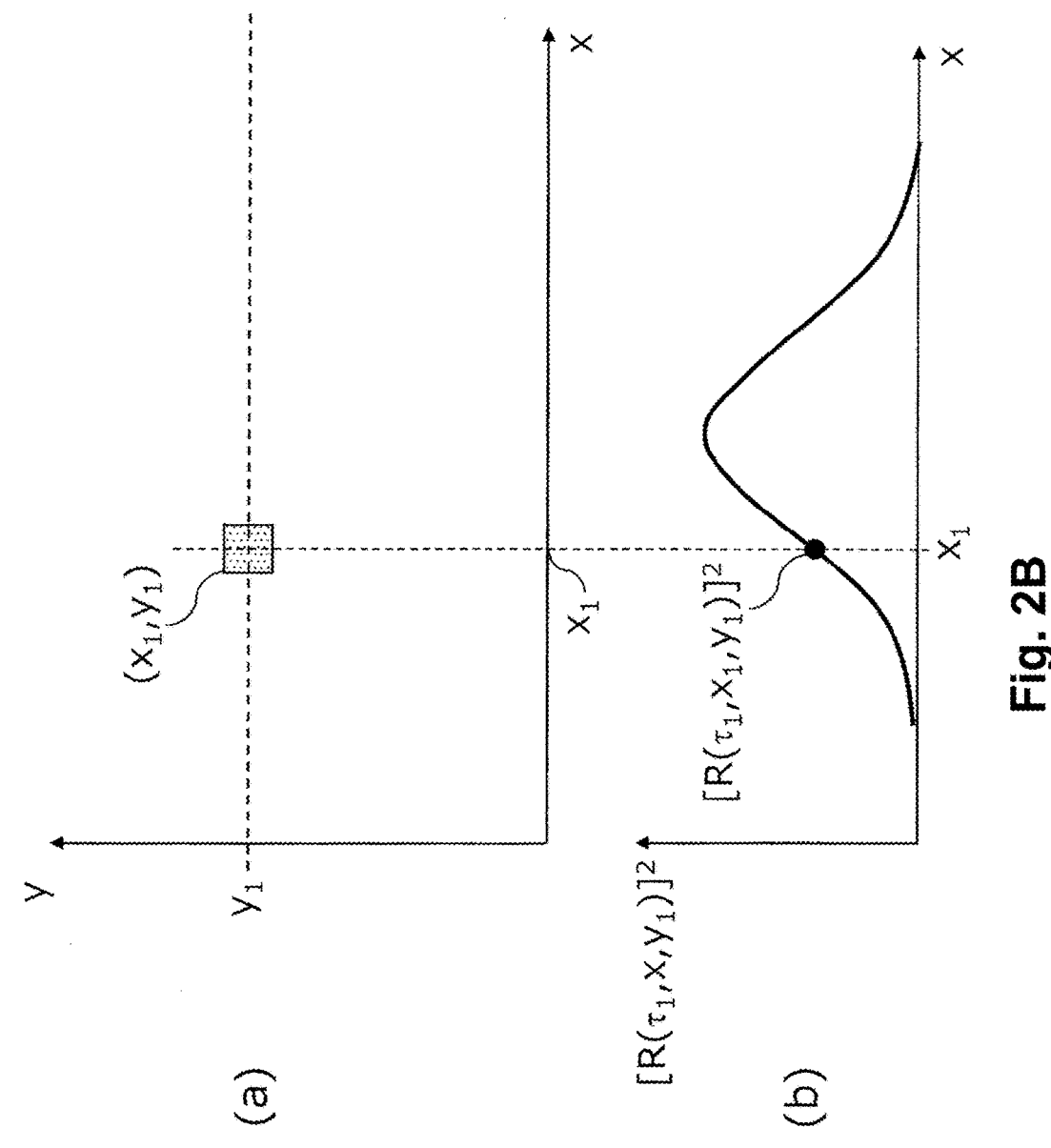
FIG. 2B is a conceptual diagram of a calculation result of a square of an autocorrelation function in the present disclosure.

The light intensity pattern will be described with reference to FIG. 2B. As illustrated in FIG. 2B(*a*), each pixel constituting the two-dimensional imaging sensor can be expressed as two-dimensional coordinates using a value of the x-axis and a value of the y-axis.

In the present disclosure, [R (τ, x, y)]² is calculated for each pixel constituting the two-dimensional imaging sensor. For example, [R ($\tau_1$, x, y)]² at time $\tau_1$ is calculated for the pixel corresponding to the ($x_1$, $y_1$) coordinates illustrated in FIG. 2B(*a*). in the same way, given that [R ($\tau_1$, x, $y_1$)]² at the same time $\tau_1$ is calculated for each pixel on y=$y_1$, that is, each of the pixels whose y coordinates are $y_1$ and whose x coordinates are different, a light intensity distribution pattern of [R ($\tau_1$, x, $y_1$)]² with respect to the x axis is obtained as illustrated in FIG. 2B(*b*). As described above, by calculating [R ($\tau_i$, x, y)]² at the time $\tau_i$ for the (x, y) coordinates of each pixel constituting the two-dimensional imaging sensor, the light intensity distribution pattern of the i-th propagation mode can be obtained as a two-dimensional distribution.

Figure 3:
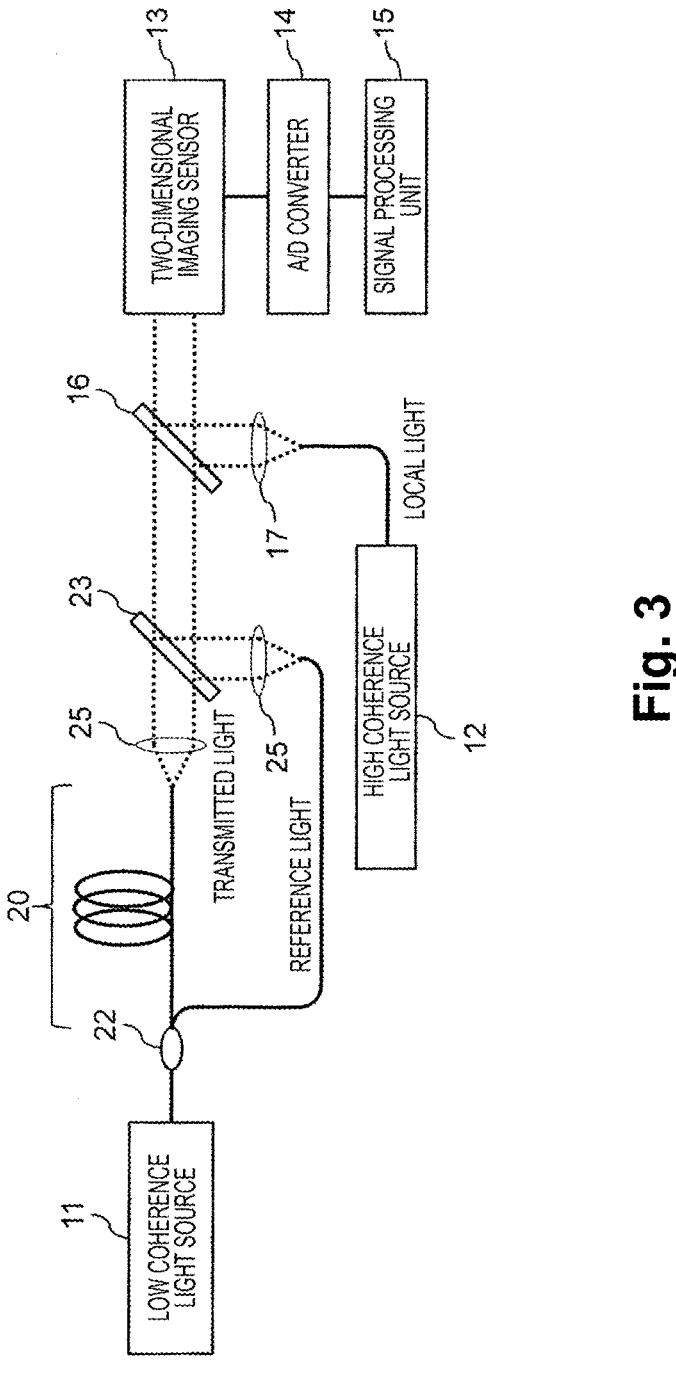
FIG. 3 is a block diagram illustrating the configuration of a device in an embodiment of the present disclosure.

FIG. 3 is a block diagram illustrating a device configuration of the light intensity distribution pattern measurement device 10 in the present embodiment. A low coherence light source 11 is used as the first light source, and a high coherence light source 12 is used as the second light source. The high coherence light source 12 functions as a second light source that outputs local light. The continuous light output from the low coherence light source 11 is branched at a coupler 22, one branched light is injected into the optical fiber under measurement 20, and the other branched light is used as the reference light. Hereinafter, the low coherence light transmitted through the optical fiber under measurement 20 is referred to as transmitted light.

In the present disclosure, reference light whose intensity is larger than the intensity of transmitted light is used. This can keep the reception signal correlation between the propagation modes of the optical fiber under measurement negligible in the square of the autocorrelation function. Therefore, the branching ratio to the reference light in the coupler 22 is larger than the branching ratio to the side of the optical fiber under measurement 20.

The transmitted light is converted into a plane wave by a lens 25*a* and then transmitted through a semi-reflective element 23. The reference light is converted into a plane wave by the lens 25*b* and then reflected by the reflective element 23 in the traveling direction of the transmitted light.

As a result, the transmitted light and the reference light are multiplexed by the semi-reflective element 23. Thereafter, the transmitted light multiplexed with the reference light is transmitted through the semi-reflective element 16.

Here, the lens 25a maintains the light intensity distribution of the transmitted light and the reference light, and converts the transmitted light into a plane wave so as to set a beam diameter thereof corresponding to the light receiving area of the two-dimensional imaging sensor 13. The lens 25b converts the reference light into a plane wave so as to set a beam diameter thereof larger than that of the plane wave of the transmitted light.

The high coherence light source 12 outputs local light, which is high coherence light, toward the lens 17 and converts the local light into a plane wave. The local light, after being converted into the plane wave, is reflected by the semi-reflective element 16 in the traveling direction of the transmitted light. As a result, the light obtained by multiplexing the reference light and the transmitted light is further multiplexed with the local light by the semi-reflective element 16. Here, the lens 16 converts the reference light into a plane wave so as to set a beam diameter thereof equal to or larger than that of any plane wave of the transmitted light and the reference light.

In the light intensity distribution pattern measurement device 10, the light obtained by multiplexing the transmitted light, the reference light, and the local light is received by the two-dimensional imaging sensor 13 and thereby converted into an electric signal. The light reception signal that is the electrical signal obtained by the conversion is converted into a digital signal by the A/D converter 14 and transferred to the signal processing unit 15.

In measuring the light intensity distribution pattern of the i-th propagation mode, the signal processing unit 15 calculates an autocorrelation function R ($\tau_i$, x, y) and its square [R ($\tau_i$, x, y)]$^2$, taking $\tau = \tau_i$ ($\tau_i$ is a propagation delay time difference of the i-th propagation mode with respect to the reference light) in Expression (7), using the light reception signal I (t, x, y) of each pixel converted into a digital signal. For each pixel constituting the two-dimensional imaging sensor, [R ($\tau_i$, X, y)]$^2$ is calculated and a light intensity distribution pattern of the i-th propagation mode is obtained.

The transmitted light and the reference light emitted from the low coherence light source 11 used in the present embodiment each have coherence time shorter than the delay time difference between propagation modes, and the local light emitted from the high coherence light source 12 used in the present embodiment has coherence time longer than the delay time difference between propagation modes.

The signal processing unit 15 of the present disclosure can also be implemented on a computer and in a program, and the program can be recorded on a recording medium or be provided through a network. The multiplexing of the transmitted light and the high coherence light is not limited to the spatial optical system, and any configuration can be adopted.

Advantageous Effects of Invention

By using the present disclosure, the light intensity distribution pattern can be measured without adjusting the optical path length of the reference light. As a result, as compared with the conventional low coherence optical interference method, the requirement for the accuracy of the optical system design and the stability of the installation environment is alleviated, the measurement is simplified, and the measurement can be performed even in a long optical fiber exceeding the restriction derived from the conventional optical path length movable range.

INDUSTRIAL APPLICABILITY

The present disclosure can be applied to the information and communications industry.

REFERENCE SIGNS LIST

10 Light intensity distribution pattern measurement device
11 Low coherence light source
12 High coherence light source
13 Two-dimensional imaging sensor
14 A/D converter
15 Signal processing unit
16 Semi-reflective element
17 Lens
20 Optical fiber under measurement
22 Coupler
23 Semi-reflective element
25 Lens

The invention claimed is:

1. A light intensity distribution pattern measurement device comprising:
   a first light source for outputting first continuous light;
   a second light source for outputting second continuous light as local light;
   a two-dimensional imaging sensor for receiving multiplexed light obtained by multiplexing transmitted light that is obtained by injecting one branched light of the first continuous light into an optical fiber under measurement, reference light that is the other branched light of the first continuous light, and the local light;
   a processor; and
   a storage medium having computer program instructions stored thereon, when executed by the processor, perform:
   digital signal processing on a light reception signal I (t) of each pixel obtained by the two-dimensional imaging sensor, and
   measures a light intensity distribution pattern by calculating a square of an autocorrelation function between the light reception signal I (t) and a light reception signal I ($\tau$+T) obtained by shifting the light reception signal by time $\tau$ for each pixel of the two-dimensional imaging sensor.

2. The light intensity distribution pattern measurement device according to claim 1,
   wherein a coherence time of the first continuous light is shorter than a delay time difference between propagation modes of the optical fiber under measurement, and
   a coherence time of the local light is longer than the delay time difference between propagation modes of the optical fiber under measurement.

3. The light intensity distribution pattern measurement device according to claim 1,
   wherein the time T is a propagation delay time difference between a given propagation mode of the optical fiber under measurement with respect to the reference light.

4. The light intensity distribution pattern measurement device according to claim 1,
   wherein an intensity of the reference light is greater than an intensity of the transmitted light such that a light reception signal correlation between propagation modes of the optical fiber under measurement is negligible with respect to the square of the autocorrelation function.

5. A light intensity distribution pattern measurement method comprising:

receiving, by a two-dimensional imaging sensor, multiplexed light obtained by multiplexing transmitted light that is obtained by injecting one branched light of first continuous light into an optical fiber under measurement, reference light that is the other branched light of the first continuous light, and local light that is second continuous light; and measuring a light intensity distribution pattern by calculating a square of an autocorrelation function between a light reception signal $I(t)$ of each pixel obtained by the two-dimensional imaging sensor and a light reception signal $I(\tau+T)$ obtained by shifting the light reception signal by time $\tau$ for each pixel of the two-dimensional imaging sensor.

6. The light intensity distribution pattern measurement method according to claim 5, wherein a coherence time of the first continuous light is shorter than a delay time difference between propagation modes of the optical fiber under measurement, and a coherence time of the local light is longer than the delay time difference between propagation modes of the optical fiber under measurement.

7. The light intensity distribution pattern measurement method according to claim 5, wherein the time $\tau$ is a propagation delay time difference between a given propagation mode of the optical fiber under measurement with respect to the reference light.

8. The light intensity distribution pattern measurement method according to claim 5, wherein an intensity of the reference light is larger than an intensity of the transmitted light such that a light reception signal correlation between propagation modes of the optical fiber under measurement is negligible with respect to the square of the autocorrelation function.

* * * * *